Sept. 4, 1956   J. R. SNYDER   2,761,462
FLOW DIVIDER
Filed Sept. 20, 1950   3 Sheets-Sheet 1

Inventor
Jacob Rush Snyder

Sept. 4, 1956  J. R. SNYDER  2,761,462
FLOW DIVIDER
Filed Sept. 20, 1950  3 Sheets-Sheet 2

Inventor
Jacob Rush Snyder
by Hill, Sherman, Meroni, Gross & Simpson
Attys

_United States Patent Office_

2,761,462
Patented Sept. 4, 1956

2,761,462

FLOW DIVIDER

Jacob Rush Snyder, Cleveland, Ohio, assignor to Thompson Products, Inc., Cleveland, Ohio, a corporation of Ohio Application September 20, 1950, Serial No. 185,867

15 Claims. (Cl. 137—101)

This invention relates to devices for accurate metering of fluid to a plurality of passages.

More specifically, the invention relates to fluid metering devices which accurately proportion the flow of fluid, such as liquid fuel, to a plurality of outlets by controlling the pressure drop across a fixed area orifice in each of the lines leading to the outlets.

The invention is not intended to be restricted to dividing a total fluid flow into a plurality of equal flows since it is equally well adapted to accurately maintain any given proportional relationship between the divided flows.

Hereinafter the invention will be described in connection with the control of fluid fuel flow to the combustion chamber of gas turbine engines, or the like. However, it is to be understood that the invention is not limited to use in this specific field, but can be readily utilized in a great variety of applications where accurate dividing of fluid flow is necessary or desirable.

In the fuel systems of gas turbine engines, fuel flows from a source to a manifold from which it flows into a plurality of separate passageways to nozzles in the various combustion chambers, or combustion cans, into which it is injected in an atomized spray. Equal distribution of fuel to each of the combustion cans during a large range of fuel flow is important to insure even and efficient burning in each of the cans, to prevent "hot spots" due to an over-supply of fuel to one combustion can which may cause burnout of the can, to prevent damage to the turbine, etc. Therefore, a device which will accurately divide the total fuel flow into equal proportions is of great value.

Although flow dividers utilizing the orifice pressure drop control method have been in use for some time, numerous practical difficulties have arisen which have limited their usefulness. Some of these difficulties are those affecting manufacture, such as close manufacturing tolerances to insure accurate metering of fuel and practical arrangement of the various components. Others are difficulties in performance, such as varnishing and sticking of valves and operational lag resulting in erratic metering.

It is, therefore, an object of this invention to provide a commercially practical flow divider especially adapted for mass production.

Another object of the present invention is to provide an improved device for accurately metering the flow of liquid fuel to the combustion cans in a gas turbine engine, or the like.

A further object of this invention is to provide a flow divider for accurately proportioning flow to a plurality of passages and which is dependable during a wide range of fluid flow and in a variety of operational environments.

Still another object of this invention is to provide a predetermined accurate distribution of fluid fuel to a plurality of nozzles irrespective of differences in nozzle discharge pressure and fluid fuel flow rate.

A still further object of the present invention is to provide an improved device for dividing a flow of fluid into accurate proportional parts by utilizing means for controlling the pressure drop across a plurality of orifices.

Yet another object of the present invention is to provide a commercially practicable fluid flow divider in which manufacturing tolerances are eased while reliability of performance is increased.

A still further object of this invention is to provide an inexpensive flow divider which is readily adaptable for use with fuel of a wide range of grade.

A specific object of the present invention is to provide a fluid fuel device for accurately proportioning the flow of fluid to a plurality of passages in which a pilot passageway utilizes a fixed orifice upstream of an improved ball check valve and in which the static fuel pressure downstream of an orifice in each of the other passages is maintained equal to that between the fixed orifice and the ball check valve in the pilot passageway.

Other objects, features and advantages of this invention will be apparent from the following detailed description of the annexed sheets of drawings which, for purposes of illustration only, depict a preferred embodiment of the invention.

Figure 1:
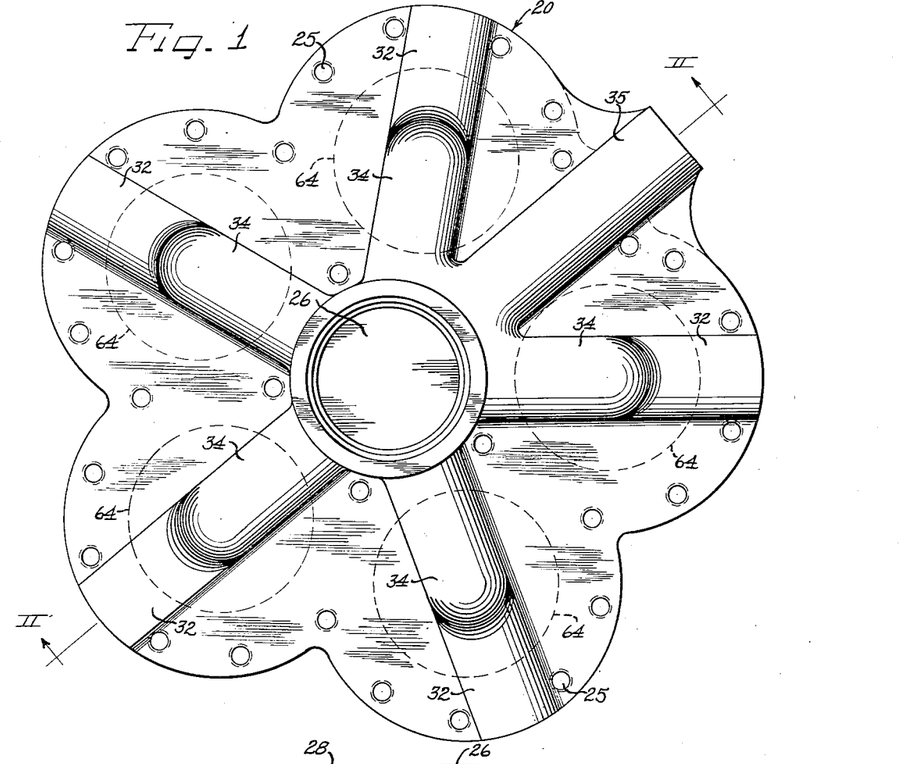
Figure 1 is a top plan view of a flow divider according to the present invention.

In Figure 1 the reference numeral 20 designates generally a flow divider assembly for accurately distributing equal parts of a total fuel flow to the fuel injection nozzles of the various combustion cans of a gas turbine engine (not shown). The flow divider 20 is of a disk or pancake type rather than the built-up sandwich type disclosed in various prior art devices. The body of the flow divider 20 comprises an upper (as positioned in the drawing) plate 21 of roughly circular plan form which is fixedly attachable to a lower or closure plate 22 of generally conforming plan form by means of bolts (not shown) inserted through a plurality of bolt holes 24 in the lower plate and threadedly inserted through corresponding threaded holes 25 through the upper body plate.

Figure 2:
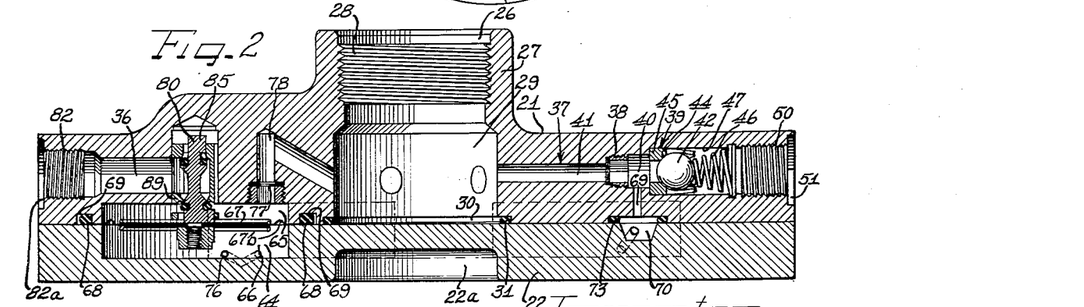
Figure 2 is a sectional view taken substantially along the line II—II of Figure 1 showing the arrangement of the pilot passageway and the arrangement of a typical one of the branch passageways.
Figure 3:
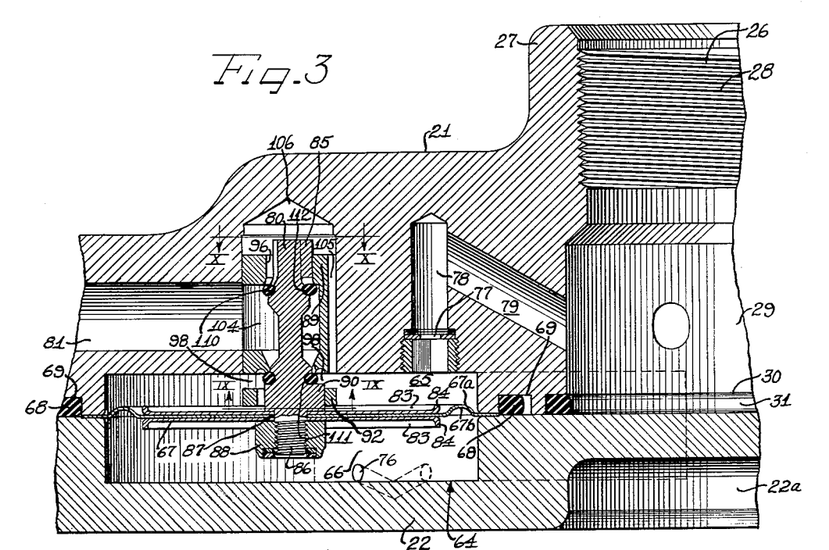
Figure 3 is an enlarged showing of the details of construction of the typical branch passageway shown in Figure 2.

The upper body plate 21 contains a central aperture 26 therethrough defined at its upper end portion by an annular boss 27 having internal threads 28 for attaching to a connecting duct member (not shown) leading from a liquid fuel source. When the plates 21 and 22 are in assembled relationship, the lower end of the aperture 26 is closed by the lower plate 22 (Figs. 2 and 3).

An enlarged lower portion of the aperture 26 defines a manifold chamber 29 and an annular rabbet groove 30 is provided at the lower end of the manifold chamber 29 adjacent the upper surface of the lower plate 22. The groove 30 contains a sealing member such as an O-ring of deformable fuel resistant material disposed therein against the surface of the plate 22 to prevent leakage from the manifold chamber 29 between the plates 21 and 22. The lower plate 21 contains a centrally located circular weight reducing recess 22a in the lower surface thereof of a diameter substantially equal to that of the manifold chamber 29.

The upper plate 21 along its upper surface contains a plurality of radially extending mounds 32, here shown as five in number, each with an upwardly offset radially inward section 34 and one radially extending continuous mound 35, all of which mounds extend from the boss 27 to the outer extremities of the plate 21 in substantially spaced angular relationship. The five mounds 32 house branch passages 36 (Figure 2) leading from the manifold chamber 29 to the outer periphery of the flow divider 20, and the mound 35 houses a pilot passage 37, also leading from the manifold chamber 29 to the outer periphery of the flow divider.

Pilot means are provided in the pilot passage 37 for metering fuel flow to one of the fuel injection nozzles (not shown) and for providing a metering control pressure to act as a standard for maintaining the fuel flow through the branch passages 36 equal to that through the pilot passage 37. The pilot means include generally a fixed orifice 38 located upstream of a variable orifice 39 and defining a control pressure chamber 40 therebetween.

Figure 4:
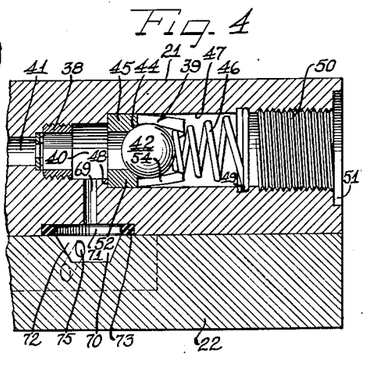
Figure 4 is an enlarged showing of the structural arrangement of the pilot passageway illustrated in Figure 2.

Referring to the more detailed Figure 4 in conjunction with Figure 2, it will be seen that fuel flowing into the pilot passage 37 flows from the manifold chamber 29 through a circular bore 41 and then through the fixed orifice 38 into the control pressure chamber 40. The fluid pressure within the chamber 40 acts upon the variable orifice 39 to urge a ball check valve 42 thereof from a valve seat 44 formed in an annular valve seat member 45 against the bias of a conically shaped coiled compression spring 46.

The seat member 45 is pressed into a cylindrical enlargement 47 of the pilot passage bore and is abutted against an annular shoulder 48 at the downstream end of the chamber 40. The spring 46 has its downstream end retained in an annular groove 49 formed in the wall of the passageway 47 downstream of the seat member 45. The smaller upstream end of the spring is retainingly disposed against the ball 42 to urge it against the valve seat 44 with a predetermined force. Thus, the spring 46 provides a means for varying the open area through the variable orifice 39 in response to the pressure within the chamber 40. The conical shape of the spring permits it to be retained in the passage enlargement 47 without the need for a shoulder or other abutment means which would tend to restrict the passage.

Downstream of the groove 49 internal threads 50 are provided in the passage enlargement 47 for the purpose of providing an attachment to a duct (not shown) leading to one of the fuel injection nozzles in a gas turbine combustion can. A shallow annular gasket 51 is provided about the downstream end of the passage 47.

Referring to the specific structure of the variable orifice 39 (Figures 4, 12 and 13), it will be seen that the valve seat member 45 is of the crown-type with an annular upstream portion 52 which contains the valve seat 44 at the inner downstream peripheral corner thereof. A plurality, herein shown as four in number, of integral guide extensions or fingers 54 extend downstream therefrom to maintain the ball 42 concentric with respect to the axis of the valve seat member. When the ball 42 is unseated by fluid pressure from the seat 44, fluid fuel passes between the seat 44 and the ball into openings between the fingers 54 and then downstream in the passage enlargement 47. Openings 54a between the fingers 54 are substantially V-shaped and hence are narrow close to the seat 44 and widen downstream to provide a smooth increase in aggregate flow area as the ball 42 moves farther downstream in response to an increasing upstream pressure. The upstream ends of the openings 54a are downstream of the seat 44. Therefore, the fingers 54 are of gradually decreasing width in a downstream direction and are integrally joined to the portion 52 at the upstream ends of the openings 54a. Thus, it will be seen that the variable orifice 39 provides a ball check valve in which the ball travels only in an axial direction in order to dampen the closing action and to prevent chatter of the ball on the seat. By replacing the piston or sleeve type valve used in a similar application in devices of the prior art the action of the flow divider assembly 20 is made more dependable by eliminating the varnish sticking conditions which are prevalent when these piston or sleeve-type valves are used with liquid fuel.

Figure 5:
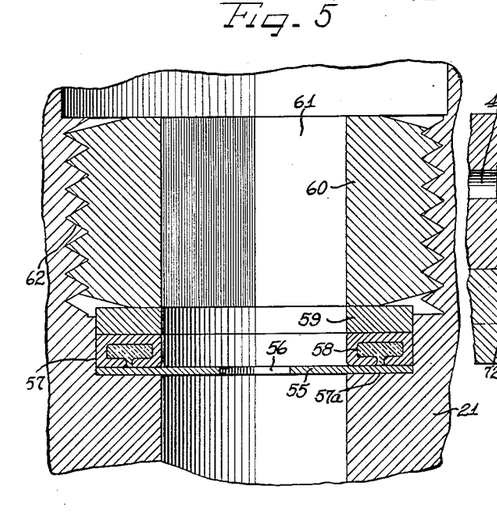
Figure 5 is a substantially enlarged sectional view showing the construction of one of the fixed orifices.

The simple and expeditious construction of the fixed orifice 38 and of the other fixed orifices in the flow divider which will be discussed below is shown in detail in Figure 5. In these orifices a thin circular orifice disk or plate 55 of a wear-resistant metal, such as beryllium bronze is provided with a sharp edged circular central aperture or orifice 56. The orifice plate 55 is disposed in an annular rabbet groove 57 provided by an enlargement in the flow passageway bore and providing a shoulder 57a against which the plate bears marginally. A copper covered asbestos washer 58 having an outside diameter approximately equal to that of the orifice plate 55 and an inside diameter approximately equal to that of the main diameter of the flow passageway is superimposed on the orifice plate 55. Superimposed on the copper covered washer 58 is a metal washer 59 of stainless steel, or the like, to prevent gouging of the copper covered washer 58. An externally threaded ring nut 60 having an axial hexagonal passageway 61 therethrough is threadedly inserted in a threaded portion 62 about the flow passageway enlargement adjacent to the groove 57 which contains the orifice plate and washers. The nut 60 is tightened against the washer 59 to hold the washers 58 and 59 and the orifice plate 55 in fixed relationship in the flow passage. Where equal flow ratio is desired all of the sharp edged orifices 56 in all of the passages 36 and 37 are of the same standard size.

The operational principle of flow dividers of this type is the maintaining of equal fluid pressures upstream of a plurality of equal sized orifices and while also maintaining equal pressures downstream of these orifices. Since the upstream pressures are maintained equal by manifolding of the fuel flow, improved means are herein provided for accurately maintaining the downstream pressures of the orifices in all of the flow passages equal during a wide range of flow variation and variations in the downstream pressures at the various discharge nozzles. Herein such control means comprise pilot downstream pressure interconnect passages for the branch passages 36 together with improved diaphragm controlled valves downstream of the fixed orifices in each of the branch passages.

Each of the branch passages 36 has a diaphragm or balance chamber 64 (Figures 2 and 3) which is formed by opposed complementary recesses 65 and 66 formed in the lower surface of the upper body plate 21 and the upper surface of the lower plate 22, respectively. The chambers 64 are spaced about the manifold chamber 29 under each of the mounds 32.

The recesses 65 and 66 are separated by means of flexible diaphragm assemblies 67 having respective resilient diaphragm portions 67a of fuel resistant material which have their peripheral margins sealingly clamped between the opposed surfaces of the plates 21 and 22 about the chambers 64. Each of the resilient diaphragm portions 67a has an annular indentation 67b thereabout to give added resiliency to the diaphragm assembly 67.

Leakage from the chambers 64 is prevented by means of O-rings 68 disposed in annular grooves 69 formed in the lower surface of the upper plate 21 in spaced relationship about the chambers 64. The O-rings 68 are pressed against the opposing surface of the lower plate 22 to maintain a fluid tight seal thereagainst.

The diaphragm assemblies 67 divide each of the chambers 64 into an upper diaphragm or balance chamber defined by the recess 65 and a lower diaphragm or balance chamber defined by the recess 66.

For maintaining the pressure in the lower chamber 66 equal to that in the control pressure chamber 40 in the pilot passage 37 a series of interconnect passages are provided. Leading downwardly from the control pressure chamber 40 is a passageway 69 which connects with an interconnect chamber 70 formed by a shallow cylindrical recess or cavity 71 formed in the lower surface of the upper plate 21 which opposes a frusto-conical recess 72 formed in the upper surface of the lower plate 22 and having a major diameter smaller than the diameter of the cylindrical recess 71. To prevent leakage from the interconnect chamber 70 an O-ring 73 of deformable fluid resistant material is disposed within the periphery of the recess 71 and is pressed against the adjacent surface of the plate 22 about the periphery of the recess 72.

Figures 6, 7, 8, 12, 13:
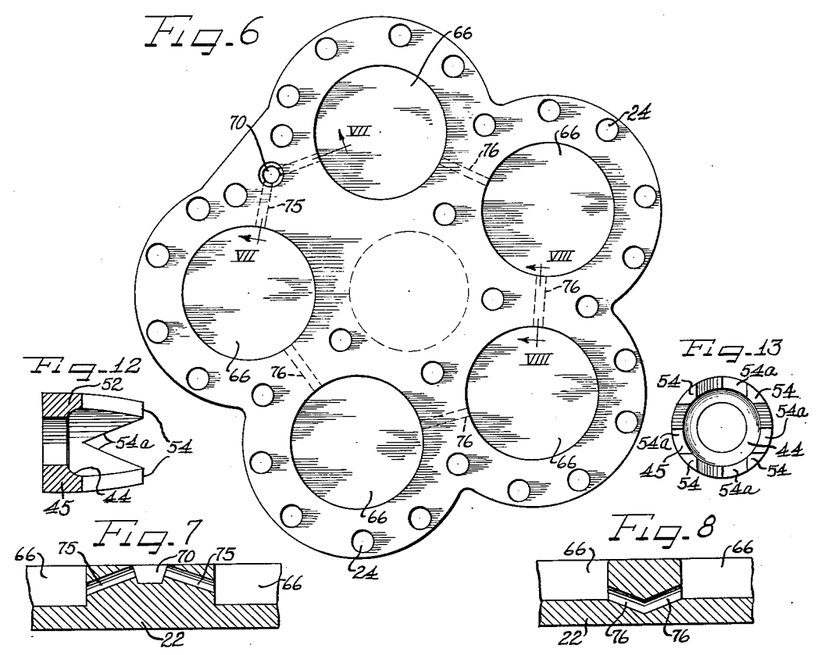
Figure 6 is an inside plan view of the closure plate of the flow divider showing the inter-connection between the diaphragm chamber recessed therein.
Figure 7 is an enlarged fragmentary sectional view taken substantially along line VII—VII of Figure 6.
Figure 8 is an enlarged fragmentary sectional view taken substantially along line VIII—VIII of Figure 6.
Figure 12 is an enlarged substantially sectional view of the ball check valve seat member.
Figure 13 is an enlarged end elevational view of the seat member of Figure 12.

Referring now to Figures 4, 6 and 7, a pair of passageways 75 extend from the interconnect chamber 70 downwardly and radially outwardly to the lower chambers 66 adjacent the interconnect chamber 70 at each side thereof. Each of these lower chambers 66 is in turn connected to the adjacent lower chamber 66 on the other side thereof by means of a pair of connected, downwardly extending passages 76 forming V-shaped passages between each of the lower chambers 66 to the adjacent chambers at each side thereof which are not already connected by the passageways 75. Thus, each of the lower chambers 66 is interconnected with the control pressure chamber 40 of the pilot passage 41. Since the fluid fuel is substantially incompressible, the inter-flow required between the chambers 66 and the control chamber 40 to equalize the pressures therebetween is very small and hence, the pressure drop in the connecting passageways is negligible so that for all practical purposes the pressure therein will be exactly equal regardless of variations in total fuel flow or nozzle discharge pressures.

In the present instance pressure responsive means are provided for maintaining the flow in each of the branch passages 36 equal to that through the pilot passage 37 over a wide range of the total flow. The means are shown in Figure 2 and in greater detail in Figure 3. As shown in these figures, a round sharp edged orifice 77, exactly equal in size to the orifice 38 in the passageway 37 and constructed as shown in Figure 5, is located in a vertical portion 78 of the passage 36 which is connected to the manifold chamber 29 by a connecting portion 79 slanted upwardly and radially outwardly from the manifold chamber into the mound portion 34 of the associated passage 36. The orifice 77 is located upstream of the upper balance chamber 65 which is separated from the lower balance chamber 66 by means of the resilient diaphragm 67.

The diaphragm 67 is connected at substantially its center to a movable portion of a balanced valve assembly 80 which opens when the diaphragm 67 is pressure deflected downwardly to allow liquid fuel to flow therethrough into a downstream portion 81 of the passage 36. The passage portion 81 terminates with an enlarged diameter internally threaded portion 82 which is adapted for connecting to a duct (not shown) which leads to the discharge nozzle in one of the gas turbine combustion chambers. A shallow annular gasket recess 82a is provided about the downstream end of the threaded portion 82.

For stiffening the central portion of the diaphragm assembly 67 to insure proper responsiveness of the diaphragm as a unit in response to changes in pressure in the chambers 65 and 66 and to insure rigid attachment with a movable spool portion 85 of the valve assembly 80, a pair of rigid clamping disk members 83 having stiffening flanges 84 about their outer periphery are disposed on each side of the diaphragm in contact therewith. The movable valve spool portion 85 of the valve assembly 80 has an externally threaded lower end portion or stem 86 extending downwardly through a central mating hole 87 in the diaphragm assembly 67. The valve spool 85 is secured to the diaphragm assembly 67 by means of a stop nut 88 which is threadedly inserted over the steam 86 and bears retainingly against the lower surface of the diaphragm assembly.

The movable valve spool 85 is slidably disposed in a valve seat sleeve member 89. The valve spool 85 has an elongated body portion with a lower guide portion 90 having three integral guide ears 91 evenly spaced about the periphery thereof. The ears 91 slidably contact an integral guide ring 92 formed at the lower portion of the sleeve 89. The valve spool 85 has an upper guide portion 94 with three integral ears 95 evenly spaced about the periphery thereof. The ears 95 are disposed in sliding contact with the periphery of a circular guide aperture 96 formed through the upper end of the sleeve 89 and coaxial with the guide ring 92 thereon.

Figure 9:
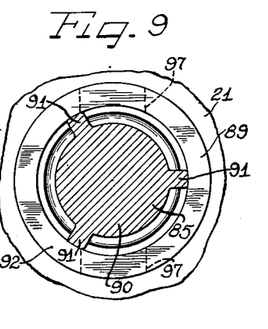
Figure 9 is an enlarged fragmentary sectional view taken substantially along line IX—IX of Figure 3.
Figure 10:
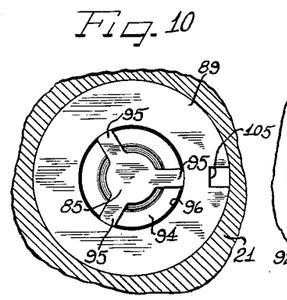
Figure 10 is an enlarged fragmentary sectional view taken substantially along line X—X of Figure 3.
Figure 11:
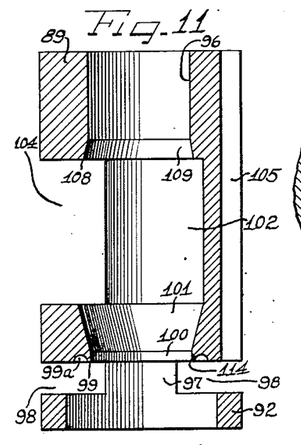
Figure 11 is an enlarged longitudinal sectional view of one of the valve sleeves in one of the branch passages.

The guide ring 92 is connected to the remainder of the sleeve 89 by means of a pair of narrow integral bars 97 (Figures 9 and 11) providing cutaway ports or apertures 98 between the ring and the rest of the sleeve to allow fluid to pass from the chamber 65 to and through an annular valve seat 99 formed at the lower end of the portion of the sleeve 89 above the ring 92. The valve seat is rather sharply defined by an annular groove 99a at the radially outer side thereof. The valve seat 99 defines the lower periphery of an aperture 100 having an upwardly flaring conical portion 101 which provides access to a central chamber 102 in the central portion of the sleeve 89 and which in turn connects with the passageway 81 through a large aperture 104 through the side of the sleeve. Fluid fuel may also enter the central chamber 102 through the upper guide aperture 96 by means of a longitudinal channel or groove 105 formed along the outer periphery of the sleeve 89 which allows fuel to pass therethrough to an upper chamber 106 formed in the upper plate 21 above the sleeve. The upper chamber is substantially an extension of a larger cylindrical chamber 107 in which the sleeve 89 is fixedly disposed as by being pressed thereinto. A second valve seat 108 is defined by the lower end portion of a short downwardly flared conical portion 109 at the lower end of the guide aperture 96.

In order to eliminate the need of close manufacturing tolerances in forming the valve assembly 80, valve seat rings 110 of resilient fuel resistant material and preferably circular cross section are retainingly disposed in complementary annular grooves 111 and 112 formed above the lower guide portion and below the upper guide portion about the valve spool 85, respectively. The ring seats 110 are so positioned on the valve spool 85 that they will contact the valve seats 99 and 108 substantially simultaneously in order to cut off fuel flow from the upper balanced chamber 65 to the passageway 81. Since the rings are of resilient material, close tolerances are not necessary for the location of the rings with respect to each other, the diameter of the rings and the cooperating valve seats, or for the location of the valve seats with respect to one another since slight errors will be compensated for because of the "give" in the rings themselves. The valve 85 with the ring seats 110 assembled thereon can be easily assembled with the sleeve 89 by compressing the upper ring seat with a spring clamp or by using a punch to fit the upper ring through the aperture 100. Thus, the valve assembly is of the balanced, positive cut-off type which can be easily and economically mass produced and which is not subject to varnish sticking conditions present in many other types of positive closing valves.

Means may be provided for allowing a small flow of fuel through the fully closed valve assembly 80 for idle or low speed operation. Such means may expeditiously comprise a small notch 114 formed in the lower valve seat 99 to allow a small flow of fluid between the seat and the valve ring 110 even though the valve seat and ring are otherwise in firm sealing contact.

The flow divider assembly 20 may be readily used with a wide variety of grades of fuel from aromatic aircraft fuels to very low grade fuels, such as Bunker C. When aromatic fuels are used the valve rings, O-rings and diaphragms may be made of synthetic "neoprene" or the like and when Bunker C is used, they may be made of rubber such as Hycar PA–21 or the like.

In operation, fuel enters the manifold chamber 29 through the aperture 26 from a fuel supply source such as an airplane fuel tank. From here the fuel is divided into six exactly equal portions flowing through the pilot passage 37 and the branch passages 36 to the various discharge nozzles (not shown) in the combustion cans of the gas turbine engine. Each of the passageways contains a circular sharp edged fixed orifice of exactly the same size for metering the fuel flow therethrough. The fuel pressure downstream of the orifice in the pilot passage 37 is communicated to the lower balance chambers 66 of all of the branch passages. If the fuel pressure in any of the upper balance chambers 65 is greater than that in the corresponding lower balance chamber 66, the diaphragm assembly 67 will be deflected downwardly to open the valve assembly 80. The valve assembly 80 will open to a position sufficient to allow a flow of fluid therethrough which is equal to the flow of fluid through the pilot passageway 37.

This equalization of flow will be readily apparent since the diaphragm assembly 67 will be deflected downwardly until the pressure in the chamber 65 above the diaphragm is equal to the pressure in the chamber 66 below the diaphragm, and this pressure balance will result in having the pressure drop across the fixed orifice in the branch passage exactly equal to the pressure drop across the fixed orifice in the pilot passage. Since all of the orifices are of exactly the same size, the flows therethrough will be equal. All other conditions being equal, the flow of fluid through a sharp edged orifice varies directly as the square root of the pressure drop across the orifice for an incompressible fluid. Therefore, since the pressures upstream of each of the orifices are equal and the pressure drops across each of the orifices will be equal to that across the orifice in the pilot passage 37, the flow in each of the passages 36 will always be equal to that through the pilot passage regardless of variations in total fuel flow or discharge pressure at any of the nozzles (not shown).

When it is desired to increase the total fuel flow, the pressure within the manifold chamber 29 may be increased thereby increasing the flow through the pilot passage 37 due to the increased upstream pressure of the orifice 38 with little increase in the pressure downstream of the orifice. This same increased upstream pressure will, of course, be exerted upstream of all of the other orifices to increase the flow through each of the same. The pressure downstream of the branch orifices will be maintained equal to that downstream of the pilot orifice by a wider opening of the valve assembly 80 caused by a tendency of the increased fuel flow to cause a greater pressure drop across the valve. The balance will always be achieved since the valve spool 85 will vary in position to vary the pressure drop of the valve assembly 80 in order to maintain the pressure between the orifice and the valve always equal to the pressure within the lower balance chamber 66 which in turn is always equal to the pressure downstream of the fixed orifice 38 in the pilot passage 37.

Variations in pressure downstream of the valve assembly 80, so long as the pressure downstream is not greater than the pressure upstream, will not affect the fuel flow since the valve assembly 80 will always achieve a position to maintain its upstream pressure equal to that downstream of the fixed orifice in the pilot passage.

Since the valve assembly 80 is of the balanced type by having the upstream pressure bear in opposite directions at the ends of the movable valve and since the diaphragm offers very little resistance to movement occasioned by changes in pressure, lag and inherent bias in the valve will be virtually non-existent and the fuel flow will be correctly and accurately metered to all of the passageways during all normal conditions of operation regardless of changes in total fuel flow, or in the pressures within any of the individual combustion cans of the gas turbine engine.

It will be understood that modifications and variations may be effected without departing from the scope of the novel concepts of the present invention.

I claim as my invention:

1. In a flow controlling apparatus, the improvement which comprises a body plate of roughly circular plan form having a central aperture extending axially therethrough defining at one end a fluid duct communicating with the exterior of said body plate and at the other end a manifold chamber, and a plurality of flow passages radiating from said manifold chamber within said body plate, said body plate having a separate body plate recess communicating with each of said flow passages, a closure plate fixedly attached to said body plate and of plan form generally conforming to said body plate and closing said manifold chamber at one end thereof and enclosing said recesses, said closure plate having closure plate recesses therein registering with the body plate recesses in the body plate and equal in number thereto, diaphragms disposed between the respective registering body plate and closure plate recesses with their margins retained therebetween to sealingly separate the respective registering recesses, further flow passages communicating with said body plate recesses in said body plate and opening on the periphery of said body plate, generally axially extending passages connecting with said body plate recesses and said further flow passages, valve means in said generally axial passages operated by said diaphragms and controlling flow between said body plate recesses and the respective further flow passages and operative to equalize pressures in each of the body plate recesses with the pressure in the closure plate recess registered therewith, said body plate having a pilot passage radiating from said manifold chamber through said body plate, means defining a pressure control chamber in said pilot passage, a first pilot control passage communicating with said pressure control chamber and extending to the end face of said body plate adjacent said closure plate, a second pilot control passage in said closure plate communicating with said first pilot control passage and extending from the end face of said closure plate adjacent said body plate, further pilot control passages connecting said second pilot control passage with said closure plate recesses, and fixed orifice means in said first mentioned flow passages between said manifold chamber and the respective body plate recesses.

2. In a device for proportioning a total flow of fluid into a plurality of partial flow paths, the improvement which comprises a disk-like body plate of roughly circular plan form having a central aperture extending axially therethrough defining at one end an inlet duct and at the other end a manifold chamber, said body plate having a plurality of flow passages radiating from said manifold chamber and having at one end face thereof a separate body plate recess communicating with each of the respective flow passages and forming a portion thereof, a closure plate fixedly attached to said body plate and having an end face mating with the body plate end face to close said other end of said central aperture of said body plate, said closure being disk-like and of plan form generally conforming to said body plate and having closure plate recesses in the mating end face thereof registering with the body plate recesses in the body plate and equal in number thereto, diaphragms disposed between each pair of registering recesses of the plates with their margins retained by the plates to sealingly separate the registering recesses, further flow passages opening on the periphery of said body plate, generally axially extending passages connecting said body plate recesses with said further passages, a sleeve member extending into each of said generally axially extending passages and terminating in spaced relation to the end thereof, said sleeve member having longitudinal groove means in the exterior surface thereof affording communication between the associated body plate recess and said end of the axial passage, said sleeve member having apertures at the opposite ends thereof one affording direct communication between the body plate recess and the interior of the sleeve member and the other providing communication with the body plate recess through said longitudinal groove means and said one end of the axial passage, said sleeve member having a lateral aperture affording communication between the interior thereof and the associated further flow passage opening on the periphery of the body plate, diaphragm operated valve means comprising a valve spool slidably disposed in the sleeve member and operatively connected to the associated diaphragm and having a pair of seating portions coacting with valve seats on the sleeve member to close the respective end apertures of the sleeve member, said diaphragm operated valve means being operable to equalize the pressure in each of the body plate recesses with the pressure in the closure plate recess registered therewith, and pilot persssure control means associated with the body plate and closure plate assembly communicating with said closure plate recesses to determine the pressure in each of said closure plate recesses and thereby to control the pressures in the respective body plate recesses, and metering means disposed in each of the flow passages between said manifold chamber and the respective body plate recesses.

3. In a flow controlling apparatus, the improvement which comprises a disk-like body plate of roughly circular plan form having a central aperture defining a manifold chamber, said body plate having a plurality of flow passages therein radiating from said manifold chamber and having a plurality of recesses in one end face of said body plate one communicating with each of said flow passages, a disk-like closure plate having an end face mating with said one end face of said body plate and having closure plate recesses in the mating end face thereof registering with the recesses in the body plate, diaphragms disposed between each of the recesses of the body plate and the respective registering recesses of the closure plate, and the respective registering recesses of the closure plate, and the respective further flow passages opening on the periphery of said body plate, generally axially extending passages connecting said body plate recesses with said further flow passages, valve means in said generally axially extending passages operatively connected to said diaphragms and controlling flow between said body plate recesses and the respective further flow passages, said valve means being operative to equalize the pressure in each of the body plate recesses with the pressure in the corresponding closure plate recess registered therewith, threaded bores extending generally axially of said body plate from the recesses thereof and communicating with said flow passages radiating from the manifold chamber, and fixed orifice means threadedly retained in said bores to provide a fixed aperture between said manifold chamber and each of said body plate recesses, and pilot control means communicating with each of said closure plate recesses for determining the pressure therein to thereby determine the pressure in the respective body plate recesses.

4. In a flow controlling apparatus, the improvement which comprises a disk-like body plate or roughly circular plan form having a central aperture defining a manifold chamber, said body plate having a plurality of flow passages radiating from said manifold chamber and having a plurality of body plate recesses in one end face thereof one of said body plate recesses communicating with each of said flow passages, a disk-like closure plate fixedly attached to said body plate and having an end face mating with said body plate end face, said closure plate being of plan form generally conforming to said body plate and having closure plate recesses in the mating end face thereof registering with the recesses in the body plate, fluid pressure responsive means disposed between each of the recesses in the body plate and the corresponding registering recess in the closure plate and dividing the registering recesses into two chambers, the body plate recess providing a main flow chamber and the closure plate recess providing a pilot chamber, further flow passages communicating with said recesses in said body plate and opening on the periphery of said body plate, valve means controlling flow between said body plate recesses and the respective further flow passages and operatively connected to said pressure responsive means, said valve means being operative to equalize the pressure in each of the main flow chambers with the pressure in the associated pilot chamber, said body plate having a pilot passage radiating from said manifold chamber and opening on the periphery of said body plate and having a straight portion including a threaded portion, an enlarged diameter portion providing a shoulder downstream of said threaded portion and a further portion having a groove downstream of said shoulder, fixed orifice means threadedly retained in said threaded portion of said pilot passage, a ring insert bottomed against said shoulder and having an annular valve seat and integral downstream extending fingers, a ball check member substantially surrounded by said fingers and movable axially of said ring to coact with said valve seat to control said pilot control passage, and a substantially frusto-conical coil compression spring having its smaller end disposed against said ball check member to urge the same against the valve seat and having its larger end retained in the groove of said further portion of said pilot passage, a pilot control passage communicating with said pilot passage upstream of said ball check member and extending to said one end face of said body plate, and pilot control passages in said closure plate communicating with said body plate pilot control passage and with said pilot chambers to maintain the pressure in each of the pilot control chambers equal to the pressure upstream of said ball check member in said pilot passage.

5. In a flow controlling apparatus, the improvement which comprises a disk-like body plate of roughly circular plan form having a central aperture defining a manifold chamber and having a plurality of flow passages radiating from said manifold chamber, said body plate having a plurality of body plate recesses in one end face thereof each communicating with one of said flow passages, a disk-like closure plate fixedly attached to said body plate and having an end face mating with said one end face of said body plate, said closure plate being of plan form generally conforming to said body plate and having closure plate recesses in the mating end face thereof registering with the body plate recesses in the body plate, pressure responsive means disposed between each recess of the body plate and the registering recess of the closure plate and dividing the registering recesses into two chambers, the body plate recess providing a main flow chamber and the closure plate recess providing a pilot chamber, further flow passages communicating with said main flow chamber provided by said body plate recesses in said body plate and opening on the periphery of said body plate, valve means controlling flow between said main flow chambers and the respective further flow passages and operatively connected to the respective pressure responsive means, said body plate having a pilot passage radiating from said manifold chamber and opening on the periphery thereof, fixed orifice means in each of said first mentioned flow passages between said manifold chamber and the respective main flow chambers of said body plate, means defining a pressure control chamber in said pilot passage, a pilot control passage communicating with said pressure control chamber and extending to said one end face of the body plate, pilot control passages in said closure plate communicating with said body plate pilot control passage and extending laterally from the end face of the closure plate to the adjacent pilot chambers, and pilot control passages connecting each successive pair of adjacent pilot chambers.

6. In a flow controlling apparatus, the improvement which comprises a disk-like body plate of roughly circular plan form having a central aperture extending axially and defining a manifold chamber, said body plate having a plurality of flow passages radiating from said manifold chamber within said body plate and having a plurality of separate body plate recesses at one end face thereof one of said body plate recesses communicating with each of said flow passages, a disk-like closure plate fixedly attached to said body plate and having an end face mating with said one end face of said body plate, said closure plate being of plan form generally conforming to said body plate and having closure plate recesses in the mating end face thereof registering with the recesses in the body plate, pressure responsive means disposed between each of the recesses of the body plate and the registering recess of the closure plate and dividing the registering recesses into two chambers, the body plate recess providing a main flow chamber and the closure plate recess providing a pilot chamber, further flow passages opening on the periphery of said body plate, generally axially extending passages connecting said main flow chambers of said body plate with respective ones of said further flow passages, valve means controlling flow between said body plate main flow chambers and the respective further flow passages and operatively connected to said pressure responsive means and disposed in said generally axially extending passages, said valve means being operative to equalize the pressure in each of the body plate main flow chambers with the pressure in the corresponding pilot chamber, said body plate having a pilot passage radiating from said manifold chamber through said body plate, means defining a pressure control chamber in said pilot passage, pilot control passages through said plates and interconnecting said pressure control chamber with the pilot chambers in said closure plate, said pilot control passages including a first pilot control passage leading from said pressure control chamber to said one end face of said body plate, and further pilot control passages leading from said one end face of said closure plate mating with the one end face of the body plate to the pilot chambers in the closure plate, fixed orifice means in each of said first mentioned flow passages between said manifold chamber and the respective main flow chambers in said body plate, whereby the pressures in said pilot chambers are maintained equal to the pressure in said pressure control chamber, and said pressure responsive means acts to equalize the pressure in each of the main flow chambers with the corresponding pilot chamber.

7. In a flow controlling apparatus, a body member having a manifold chamber therein and having a generally planar end face with a plurality of body member recesses formed in said end face and opening outwardly therefrom and disposed in spaced relation about said manifold chamber, a closure member having a generally planar end face mating with said body member end face and having a plurality of closure member recesses formed in the end face thereof and opening outwardly therefrom each registering with one of said body member recesses to define a balance chamber, pressure responsive means dividing each of the balance chambers into a main flow chamber in the body member and a pilot chamber in the closure member, said body member having a plurality of ports leading to the exterior thereof and disposed in spaced relation about said manifold chamber and having a plurality of main flow passages each leading from said manifold chamber through one of the main flow chambers to one of said ports and having a pilot passage leading from said manifold chamber to a further one of said ports, valve means controlling flow in each of said main flow passages and operatively connected to and cooperable with said pressure responsive means to equalize the pressure in each of said main flow chambers with the pressure in the corresponding pilot chamber, flow metering means in each of said main flow passages between said main flow chamber therein and said manifold chamber, means defining a pressure control chamber in said pilot passage, a first pilot control passage communicating with said pressure control chamber and extending to said end face of said body member, and further pilot control passages in said closure member communicating with said first pilot control passage and with said pilot chambers.

8. In a flow controlling apparatus, a body member having a manifold chamber therein and having a generally planar end face with a plurality of body member recesses formed in said end face and opening outwardly therefrom and disposed in spaced relation about said manifold chamber, a closure member having a generally planar end face mating with said body member end face and having a plurality of closure member recesses formed in the end face thereof and opening outwardly therefrom each registering with one of said body member recesses to define a balance chamber, pressure responsive means dividing each of the balance chambers into a main flow chamber in the body member and a pilot chamber in the closure member, said body member having a plurality of ports leading to the exterior thereof and disposed in spaced relation about said manifold chamber and having a plurality of main flow passages each leading from said manifold chamber through one of the main flow chambers to one of said ports and having a pilot passage leading from said manifold chamber to a further one of said ports, valve means controlling flow in each of said main flow passages and operatively connected to and cooperable with said pressure responsive means to equalize the pressure in each of said main flow chambers with the pressure in the corresponding pilot chamber, flow metering means in each of said main flow passages between said main flow chamber therein and said manifold chamber, and means communicating with said pilot passage and with each of said pilot chambers for controlling the pressure therein.

9. The apparatus of claim 8 wherein said pressure responsive means comprises a diaphragm disposed between each body member recess and the corresponding closure plate recess, and wherein said valve means comprises a sleeve member having respective valve seats about apertures at opposite end portions of said sleeve member, a diaphragm operated valve spool slidably disposed in said sleeve, and a pair of resilient valve seat rings retainingly disposed in spaced relation about said spool to coact with the valve seats on said sleeve to close the apertures therethrough, said valve spool having longitudinal spaced ribs about the end portions thereof to coact with said sleeve to guide said spool therein.

10. The apparatus of claim 8 wherein said valve means each comprises a resilient valve ring of fluid resistant material, a plunger-type valve member carrying said ring, and a sleeve member within which said valve member is slidable and having a passageway therethrough defined by a valve seat against which said valve ring seats to close said passageway, said valve seat having a small notch therein to permit a small amount of flow to bleed through said valve assembly when the same is closed.

11. The apparatus of claim 8 wherein a variable area orifice assembly is disposed in said pilot passage, said controlling means communicating with said pilot passage on the side of said variable area orifice assembly closest to said manifold chamber, and said variable area orifice assembly comprising an annular ring member having an annular valve seat defined about the radially inward downstream end thereof, integral guide fingers extending downstream from said ring, a ball check member substantially surrounded by said fingers and movable axially of said ring to coact with said valve seat to close said pilot passage, and a substantially frusto-conical coil compression spring having its smaller end disposed against said ball check member to urge the same against said valve seat, the larger end of said spring being retained in an annular groove in the wall of the pilot passage downstream of the guide fingers.

12. A flow controlling apparatus comprising a disk like body plate of generally circular outline with a central manifold chamber and a plurality of ports opening at the peripheral edge face of said body plate, said body plate having a generally planar end face with a plurality of body plate recesses therein opening outwardly from said end face and disposed in spaced relation about said manifold chamber, a disk like closure plate having a generally planar end face mating with said body plate end face to close said body plate recesses, said body plate and said closure plate when assembled forming a pancake-like housing of an axial extent small in comparison with the diametric extent thereof, said housing having a plurality of main flow passages each leading from said manifold chamber through one of said body plate recesses to one of said ports opening at the peripheral edge face of said body plate, and means in said housing for proportioning flow through said main flow passages including metering orifices between said body plate recesses and said manifold chamber and means in said body plate recesses for equalizing pressures in each of said body plate recesses.

13. In a flow controlling apparatus, a body member of generally disk-like configuration having a central manifold chamber and a plurality of recesses disposed in spaced relation about said manifold chamber and having a plurality of ports opening at the peripheral edge face of said body member, a plurality of main flow passages each extending from said manifold chamber through one of said body member recesses to one of said ports and including a generally axially extending bore extending generally centrally from the associated body member recess and communicating laterally with said port, a diaphragm enclosing each of said body member recesses to define main flow chambers in communication with said axially extending passage portion and with said manifold chamber, means defining a pilot chamber on the opposite side of each diaphragm, pilot control means communicating with each of said pilot chambers for controlling the pressure therein, flow metering devices in each of said main flow passages between said manifold chamber and said main flow chambers, a valve sleeve in the axially extending portion of each main flow passage comprising an elongated portion extending axially of said axial passage portion and defining a central chamber therein with an aperture through the side thereof connecting said central chamber with the associated port, an integral guide ring at one end of said sleeve connected thereto by a plurality of peripheral bars defining a plurality of radial passages between the sleeve and the ring communicating with said respective body member recesses, said sleeve having an axial passage connecting said radial passages with the central chamber in the sleeve, an annular valve seat at the end of said axial passage adjacent said body member recesses, a second axial passage through the opposite end of said sleeve and connecting with the central chamber in the sleeve, a second annular valve seat at the end of said second axial passage adjacent the central chamber, said sleeve having a longitudinal groove along its outer peripheral surface defining with the wall of said axial bore in the body member a longitudinal channel affording communication between the body member recesses and the respective second axial passages through the sleeve, and valve means guided in said sleeve by said ring and said second aperture and being operatively connected to the associated diaphragm to control the pressure in said respective body member recesses in accordance with the pressure in the corresponding pilot chambers.

14. A housing assembly for receiving flow control apparatus or the like, comprising a disk like body plate of generally circular outline with a central manifold chamber and a plurality of generally radially extending ports opening at the peripheral edge face of said body plate, said body plate having a generally planar end face with a plurality of body plate recesses therein opening outwardly from said end face and disposed in spaced relation about said manifold chamber, said body plate having an axial extent small in comparison with the diametric extent thereof, a closure plate disposed in covering relation to said body plate end face, means defining a plurality of main flow passages each leading from said manifold chamber through one of said body plate recesses to one of said ports opening at the peripheral edge face of said body plate, and means operatively interconnecting certain of said main flow passages with a further one of said main flow passages for proportioning flow through the respective passages.

15. A housing part adapted to form part of a flow controlling apparatus or the like, comprising a disk-like body plate of generally circular outline having a central axial bore extending entirely therethrough between the opposite end faces thereof and defining a central manifold chamber, said body plate having a plurality of generally radial bores extending inwardly from the peripheral edge face thereof and terminating in spaced relation to said axial bore, said body plate having a generally planar end face with a plurality of body plate recesses opening outwardly from said end face and disposed in spaced relation about said manifold chamber, a closure plate disposed in overlying relation to said body plate end face, first main flow passages leading from said manifold chamber to each of said body plate recesses, and second main flow passages formed by generally axial bores extending centrally from said body plate recesses and intersecting said generally radially extending ports, said body plate having a further passage extending generally, radially from said manifold chamber to a further generally radially extending port and having a generally axially extending pilot control passage extending from said last mentioned pilot passage to said end face of said body plate, and means operably interconnecting said axially extending pilot control passage and said main flow passages at said body plate recesses for proportioning flow through the respective passages.

References Cited in the file of this patent

UNITED STATES PATENTS

| | | |
|---|---|---|
| 1,470,057 | Carter | Oct. 2, 1923 |
| 1,861,674 | Winterhoff | June 7, 1932 |
| 1,872,157 | Mastenbrook | Aug. 16, 1932 |
| 1,883,571 | Clark | Oct. 18, 1932 |
| 1,936,975 | Wasson | Nov. 28, 1933 |
| 1,991,032 | Spence | Feb. 12, 1935 |
| 2,025,545 | Muff | Dec. 24, 1935 |
| 2,044,629 | Parker | June 16, 1936 |
| 2,062,584 | Langdon | Dec. 1, 1936 |

(Other references on following page)

UNITED STATES PATENTS

| | | |
|---|---|---|
| 2,069,364 | Gussick | Feb. 2, 1937 |
| 2,138,446 | Douredoure | Nov. 29, 1938 |
| 2,214,290 | Ward | Sept. 10, 1940 |
| 2,239,116 | Ray | Apr. 22, 1941 |
| 2,242,002 | Klein | May 13, 1941 |
| 2,252,924 | Hale | Aug. 19, 1941 |
| 2,291,229 | Johnson | July 28, 1942 |
| 2,294,568 | Neilsen | Sept. 1, 1942 |
| 2,347,351 | Laing | Apr. 25, 1944 |
| 2,430,264 | Wiegand et al. | Nov. 4, 1947 |
| 2,606,066 | Thompson | Aug. 5, 1952 |
| 2,621,718 | Eaton et al. | Dec. 16, 1952 |
| 2,638,912 | Lee II | May 19, 1953 |
| 2,643,663 | Gold et al. | June 30, 1953 |
| 2,656,848 | Noon et al. | Oct. 27, 1953 |
| 2,662,541 | Noon | Dec. 15, 1953 |

FOREIGN PATENTS

| | | |
|---|---|---|
| 577,132 | Great Britain | May 7, 1946 |